US010496255B2

(12) United States Patent
Shanware

(10) Patent No.: US 10,496,255 B2
(45) Date of Patent: Dec. 3, 2019

(54) SYSTEMS AND METHODS FOR ACCENTUATING CANDIDATE CHARACTERS OF STRINGS RELATING TO PROMOTIONAL CONTENT

(71) Applicant: Rovi Guides, Inc., San Carlos, CA (US)

(72) Inventor: Ajit Shanware, Cupertino, CA (US)

(73) Assignee: Rovi Guides, Inc., San Jose, CA (US)

( * ) Notice: Subject to any disclaimer, the term of this patent is extended or adjusted under 35 U.S.C. 154(b) by 451 days.

(21) Appl. No.: 15/082,760

(22) Filed: Mar. 28, 2016

(65) Prior Publication Data

US 2017/0277402 A1  Sep. 28, 2017

(51) Int. Cl.
| | | |
|---|---|---|
| *G06F 3/048* | (2013.01) | |
| *G06F 3/0484* | (2013.01) | |
| *G06F 17/21* | (2006.01) | |
| *G06F 17/27* | (2006.01) | |
| *G06F 17/22* | (2006.01) | |

(52) U.S. Cl.
CPC ........ *G06F 3/04842* (2013.01); *G06F 17/212* (2013.01); *G06F 17/2211* (2013.01); *G06F 17/276* (2013.01)

(58) Field of Classification Search
CPC ............... G06F 3/04842; G06F 17/212; G06F 17/2211; G06F 17/276
USPC ........................................................ 715/767
See application file for complete search history.

(56) References Cited

U.S. PATENT DOCUMENTS

| | | |
|---|---|---|
| 6,239,794 B1 | 5/2001 | Yuen et al. |
| 6,388,714 B1 | 5/2002 | Schein et al. |
| 6,564,378 B1 | 5/2003 | Satterfield et al. |
| 6,622,148 B1 | 9/2003 | Noble et al. |
| 6,756,997 B1 | 6/2004 | Ward, III et al. |
| 7,165,098 B1 | 1/2007 | Boyer et al. |
| 7,657,526 B2 | 2/2010 | Aravamudan et al. |
| 7,761,892 B2 | 7/2010 | Ellis et al. |
| 7,974,962 B2 | 7/2011 | Krakirian et al. |
| 8,046,801 B2 | 10/2011 | Ellis et al. |
| 8,122,034 B2 | 2/2012 | Aravamudan et al. |

(Continued)

FOREIGN PATENT DOCUMENTS

JP    WO2010035574 A1 *  7/2009  ............. G06F 3/048

OTHER PUBLICATIONS

Machine translation of WO2010035574A1, Authour Masayoshi Ihara, PCT filing Date Jul. 29, 2009, 29 pages.*

*Primary Examiner* — Renee D Chavez
*Assistant Examiner* — Jianmei F Duckworth
(74) *Attorney, Agent, or Firm* — Haley Guiliano LLP

(57) ABSTRACT

Systems and methods are provided herein for accentuating candidate characters of strings relating to promotional content. To this end, a media guidance application may receive user input of a character through a user interface. The media guidance application may identify a plurality of strings that the character could be used to achieve, compare each string of the plurality of strings to entries of a promotional database, and identify, based on the comparing, a string that is designated as a promotional string. The media guidance application may then determine a next character of the promotional string, and may accentuate a portion of the user interface that corresponds to the next character.

18 Claims, 5 Drawing Sheets

(56) References Cited

U.S. PATENT DOCUMENTS

| | | | |
|---|---|---|---|
| 8,745,018 B1 * | 6/2014 | Singleton | G06F 17/30899 |
| | | | 707/705 |
| 9,669,291 B1 * | 6/2017 | Holme | G07F 17/3295 |
| 2002/0149569 A1 | 10/2002 | Dutta et al. | |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2007/0143260 A1 * | 6/2007 | Markov | G06Q 30/02 |
| 2010/0153885 A1 | 6/2010 | Yates | |
| 2012/0047454 A1 * | 2/2012 | Harte | G06F 3/04886 |
| | | | 715/773 |
| 2013/0211825 A1 * | 8/2013 | Tseng | G06F 17/2735 |
| | | | 704/10 |
| 2016/0140213 A1 * | 5/2016 | Kasai | G06F 17/3064 |
| | | | 705/26.61 |
| 2017/0109780 A1 * | 4/2017 | Moore | G06Q 30/0244 |

* cited by examiner

SYSTEMS AND METHODS FOR ACCENTUATING CANDIDATE CHARACTERS OF STRINGS RELATING TO PROMOTIONAL CONTENT

BACKGROUND

When a user begins to enter in a string by entering a character, it is conventional to predict what string the user intends to type, and to react by offering a possible next key to the user based on the prediction, or by prompting the user as to whether the rest of the string should be automatically completed. While predictive algorithms are marketable in their own right, these predictive algorithms are not compatible with advertising and promotional activity because they are focused on completing what the user wishes to see, rather than what a promoter wishes for the user to see.

SUMMARY

Systems and methods are provided herein for accentuating candidate characters of strings relating to promotional content. For example, when a media guidance application of user equipment detects that a user has entered a character of a string, the media guidance application may detect that a possible string that can be formed by the stem created by the character entered by the user corresponds to promotional content. The media guidance application may offer to automatically complete the string with a string relating to the promotional content, or may generate for display to the user a selectable option to access the promotional content.

To this end, in some aspects, the media guidance application may receive user input of a character through a user interface. For example, the media guidance application may receive user input of a first character of a string, or may receive input of a character to be appended on an existing stem of a string. As an example, if the string "qu" has already been entered by the user, and the user enters the character "e," the media guidance application may receive user input of the character "e" in this element.

In some embodiments, the media guidance application may identify a plurality of strings that the character could be used to achieve. For example, following from the above, if the stem "qu" had already been entered by the user, and the user enters the character "e," the media guidance application may identify that the stem "que" may lead to the strings "queen" or "query" or "quesadilla." In some embodiments, the media guidance application may identify the plurality of strings that the character could be used to achieve by accessing a database comprising entries corresponding to known words, comparing the character and any other characters that precede the character to data of the entries, and identifying a plurality of words with stems that match the character and any other characters that precede the character.

In some embodiments, the media guidance application may compare each string of the plurality of strings to entries of a promotional database. The promotional database may comprise entries that correspond promotional material with related symbols or keywords. The symbols or keywords may be strings that relate to the promotional material. For example, if a taco restaurant wishes to promote its products, an entry relating to the taco restaurant may associate the taco restaurant with the term "quesadilla."

In some embodiments, the media guidance application may identify, based on the comparing, a string that is designated as a promotional string. For example, if a user entered the stem "que" as explained above, the media guidance application may recognize that the string "quesadilla" matches the stem "que," and that the string "quesadilla" is a promotional string corresponding to the taco restaurant. In response to detecting this information, the media guidance application may determine a next character of the promotional string, and may accentuate a portion of the user interface that corresponds to the next character (e.g., by enlarging a virtual keyboard key corresponding to the character "s," because this is the next character in the term "quesadilla."

In some embodiments, the media guidance application may accentuate the portion of the user interface that corresponds to the next character comprises increasing a size of a virtual button relative to the size of virtual buttons corresponding to other candidate characters. For example, as described above, if the media guidance application is receiving the user input through a virtual keyboard, the media guidance application may enlarge a key relating to the next character on the virtual keyboard. Other techniques of accentuation may be used, such as applying a color or highlight or gloss to the key, adding an image to the key that relates to the promotional content (e.g., an image of a quesadilla, that may have been provided by the taco restaurant), and the like.

In some embodiments, when the media guidance application is accentuating the portion of the user interface that corresponds to the next character, the media guidance application may generate for display, within the virtual button, a representation of the promotional content. For example, the representation may include a picture or logo relating to the taco restaurant specifically, or may be colored in using trademark colors of the taco restaurant. As another example, a link to a website relating to the promotional content may be provided in the representation. In some embodiments, the representation may be selectable by a user, and in response to receiving a user selection of the representation, the media guidance application may generate for display the promotional content (e.g., by accessing the website).

In some embodiments, the media guidance application may, when identifying, based on the comparing, the string that is designated as a promotional string, identify a plurality of promotional strings that are designated as promotional strings. The media guidance application may, for example, take notice that the rock music group "Queen" has entries in the promotional database, and thus that both the terms "quesadilla" and "queen" may be achieved by the stem "que." The media guidance application may, when determining the next character of the string, determine a plurality of next characters, wherein each next character of the plurality of next characters corresponds to a respective promotional string of the plurality of promotional strings. For example, as described above, the character "s" is a next character relating to the term "quesadilla." Similarly, the character "e" is a next character relating to the term "Queen."

In some embodiments, the media guidance application may determine, based on the comparing, a level associated with each promotional string of the plurality of promotional strings. For example, when the taco restaurant and the rock band Queen registered with the promotional database, the registrant may have subscribed to a certain level of service offered by the promotional database. For example, each higher level of service may cause promotions to be more prevalent, and may cost more or less money to the subscriber. The entries of the promotional database may indicate the level of service purchased by both the taco restaurant and Queen. The media guidance application may, based on the indicated level, differently accentuate each next character in accordance with the level associated with the respective promotional string that is associated with the next character. For example, if the taco restaurant subscribed using a higher level than the rock band Queen, the character "s" may appear to be larger than the character "s" on the virtual keyboard after the string "que" has been entered.

In some embodiments, two different promotional strings may correspond to a same next character. For example, the movie "Queen of the Night" may have subscribed to the promotional database. Thus, if the rock band "Queen" has also subscribed to the promotional database, the media guidance application may identify both the string "Queen" and "Queen of the night" as promotional strings, and may determine that the next character associated with each of these strings is "e" when the stem "que" has been entered.

In some embodiments, the media guidance application may create an aggregated accentuation by aggregating a first accentuation and a second accentuation corresponding to each of the two different promotional strings, and may accentuate the same next character using the aggregated accentuation. For example, the media guidance application may add the level of service subscribed to by both "Queen" and "Queen of the Night" together, and may accentuate the character "e" based on the aggregated level.

In some embodiments, the media guidance application may generate for display within the accentuated same next character a representation of each promotional content corresponding to the two different promotional strings. For example, following from the example above involving "Queen of the Night" and "Queen," the media guidance application may generate for display both the logo of the band Queen, and a video clip from the movie "Queen of the Night." The media guidance application may then receive a user selection of one of the each promotional content (e.g., of the video clip), and may, in response to receiving the user selection, generate for display promotional content relating to the Queen of the Night.

In some embodiments, the media guidance application may, when accentuating the portion of the user interface that corresponds to the next character, reorganize the user interface to include the next character in a preferred portion of the user interface. For example, western literature is typically organized from top to bottom, left to right. Thus, when a page is loaded, users attention is generally first directed to the top left of a display. To this end, the media guidance application may reorganize a virtual keyboard to generate for display the next character (e.g., the character "s" or "e" according to the examples above) on the top left of the virtual keyboard.

In some embodiments, the media guidance application may compare each string of the plurality of strings to a database that stores entries corresponding to monitored user interactions, and may identify, based on the comparing, a string that the user is likely attempting to type. For example, a database may log each attempt by a user to enter a string that begins with the stem "que," and may learn that 95% of the time, a user who types in "que" intends to write the word "query."

In some embodiments, the media guidance application may determine a next character of the string that the user is likely attempting to type (e.g., based on the above-mentioned analysis of how likely a user is to complete a stem to be a certain string), and may responsively cause a size of the next character of the promotional string to exceed the size of the next character of the string that the user is likely attempting to type. Thus, while the user is most likely to intend to have a next character of the stem "que" be the character "r" to match the word "query," the media guidance application may reduce the size of the character "r" and increase the size of the character "s" because the taco restaurant has subscribed to the promotional database. This will serve to better promote the taco restaurant.

In some embodiments, the media guidance application may generate for display a visual representation of the promotional content, and may squelch a display of content relating to the string that the user is likely attempting to type. For example, if the user intends to type the word "query," the media guidance application may avoid generating for display any content that relates to the word "query," and may instead generate for display promotional material relating to the taco restaurant, such as a picture of a quesadilla, or a logo of the taco restaurant, on a display that shares the entry of the query.

DESCRIPTION

Figure 1:
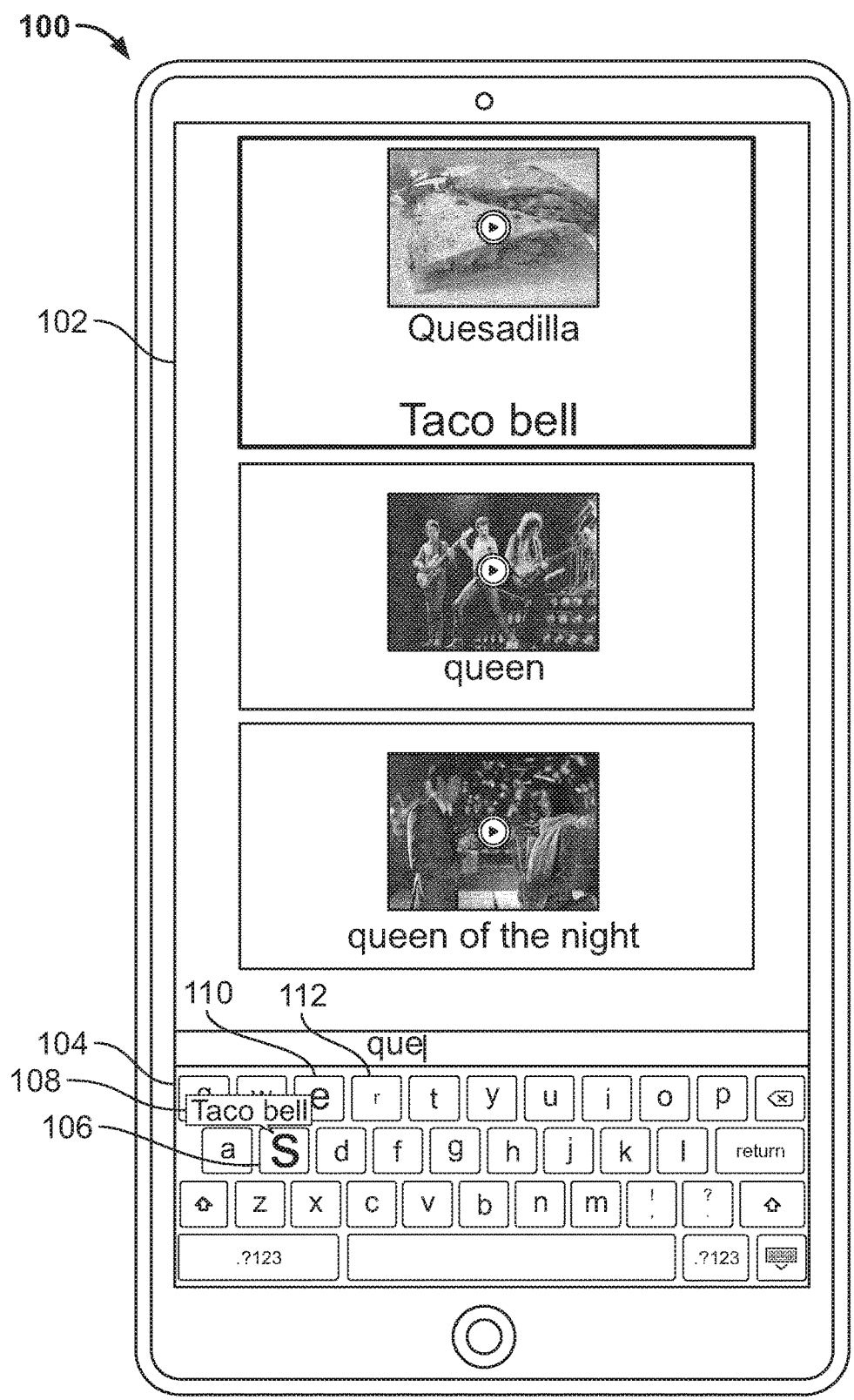
FIG. 1 depicts an illustrative embodiment of a user interface that accentuates a character relating to an entry of a promotional database, in accordance with some embodiments of the disclosure.

FIG. 1 depicts an illustrative embodiment of a user interface that accentuates a character relating to an entry of a promotional database, in accordance with some embodiments of the disclosure. FIG. 1 depicts user equipment 100. User equipment 100 may have control circuitry installed thereon, which may execute a media guidance application. While FIG. 1 depicts a display on user equipment 100, user equipment 100 may generate for display images that may be displayed on other user equipment. The functionality of user equipment, control circuitry, and the media guidance application is explained in further detail with respect to FIGS. 2-5 below.

In some aspects of the disclosure, the media guidance application of user equipment 100 may receive user input of a character through user interface, such as user interface 104. While user interface 104 is depicted as a virtual keyboard, user interface 104 may be any user input interface, as is described in greater detail below with respect to FIG. 4. The media guidance application may receive user input of a first character of a string, or may receive input of a character to be appending on an existing stem of a string. As an example, if the string "qu" has already been entered by the user, and the user enters the character "e," the media guidance application may receive user input of the character "e" in this element. Thus the string "que" is depicted above user interface 104 in FIG. 1. The term string, as used in this disclosure, means any string of characters that forms a meaning in a language, whether the meaning is a known word of a language, or has been assigned meaning by an entity that uses the string to identify any product or service it promotes. The term "string" is interchangeably used with the term "word" and "term" throughout, and these variations each hold the same force and effect. Characters may be entered by the user through any interaction with user interface 104, such as by typing characters into a virtual keyboard, by speaking a character, and the like. The word "stem" as used in this disclosure is used to refer to a beginning portion, or partial entry, of a string.

In some embodiments, the media guidance application may identify a plurality of strings that the character could be used to achieve. For example, following from the above, if the string "qu" had already been entered by the user, and the user enters the character "e," the media guidance application may identify that the stem "que" may lead to the strings "queen" or "query" or "quesadilla." In some embodiments, the media guidance application may identify the plurality of strings that the character could be used to achieve by accessing a database comprising entries corresponding to known words. The database may be located in memory local to user equipment 100, or remote to user equipment 100 at a database, and accessible by way of a communications network. The database may be, for example, a database that stores dictionary entries in addition to proper nouns that correspond to known entities (e.g., company names, product names, and the like). The media guidance application may compare the character and any other characters that precede the character to data of the entries, and identifying a plurality of words with stems that match the character and any other characters that precede the character.

In some embodiments, the media guidance application may compare each string of the plurality of strings to entries of a promotional database. The promotional database may comprise entries that correspond promotional material with related symbols or keywords. The symbols or keywords may be strings that relate to the promotional material. For example, if a taco restaurant wishes to promote its products, an entry relating to the taco restaurant may associate the taco restaurant with the term "quesadilla."

In some embodiments, the promotional database may be populated by individual entities subscribing to a promotional service. The entities may be offered an ability to purchase a service that causes characters of user interface 104 to be accentuated that, if selected, would cause a user to come closer to typing in a string relating to an entity's promotion. For example, if a taco company, such as the fast food chain Taco Bell, subscribed to the promotional service, the fast food chain Taco Bell may want a user to search words relating to "Taco Bell," such as "Taco" and "Quesadilla" because this may lead to increased advertisement and sale opportunities to end users. The promotional service may offer different levels, or tiers, of service, each of which cost a different price. When a higher level of service is purchased, characters relating to the purchasing entity's products may be accentuated above and beyond those relating to other subscriber's products. This will be described in further detail below.

The advertisement database may include entries for each promotional entity. Each entry may be a data structure that indicates a purchased level of service. Also included in the data structure may be keywords or symbols associated with the purchasing entity's product(s) that the purchasing entity seeks to promote. For example, if Taco Bell is releasing a new quesadilla product, Taco Bell may want to lead users to type either the string "quesadilla" or "product," and may in either case advertise to the user information about its new quesadilla product through its subscription.

Going back to the operation of the media guidance application, in some embodiments, the media guidance application may identify, based on the comparing of the string to the entries of the promotional database, a string that is designated as a promotional string. For example, if a user entered the stem "que" as explained above, the media guidance application may recognize that the string "quesadilla" matches the stem "que," and that the string "quesadilla" is a promotional string corresponding to the taco restaurant. The media guidance application may carry out this determination by comparing the stem "que" to the stem of each word of the promotional database.

In response to detecting this information, the media guidance application may determine a next character of the promotional string, and may accentuate a portion of the user interface that corresponds to the next character. Following from the Taco Bell example, if the media guidance application determines that the user enters the stem "que," the media guidance application may determine that the word "quesadilla" is to be promoted. Therefore, the media guidance application may accentuate key 106. Ways of accentuating key 106 are described below.

In some embodiments, the media guidance application may accentuate key 106 by increasing a size of key 106 relative to the size of other keys of user interface 104 that correspond to other candidate characters. As depicted in FIG. 1, key 106 may be accentuated by being enlarged relative to other characters of user interface 104. Other techniques of accentuation may be used, such as applying a color or highlight or gloss to the key, adding an image to the key that relates to the promotional content (e.g., an image of a quesadilla, that may have been provided by the taco restaurant), and the like.

In some embodiments, when the media guidance application is accentuating the portion of the user interface that corresponds to the next character, the media guidance application may generate for display, within key 106, a representation of the promotional content (e.g., representation 108). Representation 108 may include a picture or logo, a video, a link to a website, and/or any other content relating to a subscriber of the promotional service. Following the example of Taco Bell, representation 108 may be a coloring in of key 106 with trademark colors of Taco Bell. Representation 108 may also be outside of key 106, such as in display 102. Display 102 may display any content relating to the string the user is inputting, or any other content, but may additionally include representation 108. In some embodiments, representation 108 may be selectable by a user, and in response to receiving a user selection of the representation, the media guidance application may generate for display the promotional content (e.g., by accessing the Taco Bell website).

In some embodiments, the media guidance application may identify a plurality of promotional strings that are designated as promotional strings that relate to the stem. The media guidance application may, for example, detect that the rock music group "Queen" has entries in the promotional database, and thus that both the terms "quesadilla" and "queen" may be achieved by the stem "que." The media guidance application may, when determining the next character of the string, determine a plurality of next characters, wherein each next character of the plurality of next characters corresponds to a respective promotional string of the plurality of promotional strings. For example, as described above, the character "s" is a next character relating to the term "quesadilla." Similarly, the character "e" is a next character relating to the term "Queen." Thus, the media guidance application may accentuate both key 106 and key 110, as either of these keys may lead to promotional content.

As was discussed in the foregoing, in some embodiments, the media guidance application may determine, based on the comparing, a level associated with each promotional string of the plurality of promotional strings. For example, if the media guidance application has found entries in the promotional database relating to both Taco Bell (e.g., quesadilla) and the rock band Queen, the media guidance application may determine levels of service subscribed to by both Taco Bell and Queen. The media guidance application may, based on the indicated level, differently accentuate each next character in accordance with the level associated with the respective promotional string that is associated with the next character. For example, as is depicted in FIG. 1, if the media guidance application detects that Taco Bell subscribed using a higher level than the rock band Queen, the media guidance application may cause key 106 to appear to be larger than key 110 on the virtual keyboard after the string "que" has been entered, as key 106 corresponds to the character "s," which leads to Taco Bell's product, and key 110 corresponds to the letter "e," which leads to Queen's product, but which is associated with a lower level.

In some embodiments, the media guidance application may determine that two different promotional strings may correspond to a same next character. For example, the owners of the movie "Queen of the Night" may have subscribed to the promotional service. Thus, if the rock band "Queen" has also subscribed to the promotional database, the media guidance application may identify both the string "Queen" and "Queen of the night" as promotional strings, and may determine that the next character associated with each of these strings is "e" when the stem "que" has been entered. In order to resolve which key(s) of user interface 104 to accentuate in such a scenario, the media guidance application may create an aggregated accentuation by aggregating a first accentuation and a second accentuation corresponding to each of the two different promotional strings, and may accentuate the same next character using the aggregated accentuation. The levels of accentuation may be determined based on each level subscribed to by the rock band Queen, and by the owner of the movie Queen of the Night. To perform the aggregation, the media guidance application may add the level of service subscribed to by both Queen and Queen of the night together, and may accentuate the character "e" based on the aggregated level. This may, although not depicted, result in the media guidance application generating for display key 110 with a larger accentuation than key 106, if the aggregated levels exceed the level subscribed to by Taco Bell.

In some embodiments, the media guidance application may generate for display within the accentuated same next character a representation of each promotional content corresponding to the two different promotional strings. For example, following from the example above involving "Queen of the Night" and "Queen," the media guidance application may generate for display representation 108 for both the logo of the band Queen, and a video clip from the movie "Queen of the Night." The media guidance application may then receive a user selection of the representation 108 corresponding to Queen of the night, and may responsively generate for display promotional content relating to the Queen of the Night (e.g., by accessing a website relating to Queen of the Night).

In some embodiments, the media guidance application may, when accentuating the portion of the user interface that corresponds to the next character, reorganize the user interface to include the next character in a preferred portion of the user interface. For example, western literature is typically organized from top to bottom, left to right. Thus, when a page is loaded, users' attention is generally first directed to the top left of a display. To this end, the media guidance application may reorganize a virtual keyboard to generate for display the next character (e.g., the character "s" or "e" according to the examples above) on the top left of user interface 104. Assuming that key 106 corresponds to the character to be accentuated, the media guidance application may reorganize user interface 104 in any way that accentuates key 106. This may include generating an overlay of key 106 on top of display 102. This may also include generating multiple copies of key 106. The media guidance application may use a camera to track where a user's attention is with respect to a display, and may place key 106 where the user's vision is directed.

In some embodiments, the media guidance application may compare each string of the plurality of strings to a database that stores entries corresponding to monitored user interactions, and may identify, based on the comparing, a string that the user is likely attempting to type. For example, a database may log each attempt by a user to enter a string that begins with the stem "que," and may learn from entries of the database that 95% of the time, a user who types in "que" intends to write the word "query."

In some embodiments, the media guidance application may determine a next character of the string that the user is likely attempting to type (e.g., based on the above-mentioned analysis of how likely a user is to complete a stem to be a certain string), and may responsively cause a size of the next character of the promotional string to exceed the size of the next character of the string that the user is likely attempting to type. For example, as depicted in FIG. 1, while the user is most likely to intend to have a next character of the stem "que" be the character "r" (which corresponds to key 112) to match the word "query," the media guidance application may reduce the size of key 112 and increase the size of key 106 (which corresponds to the character "s") because Taco Bell has subscribed to the promotional database.

In some embodiments, the media guidance application may generate for display a visual representation of the promotional content, and may squelch a display of content relating to the string that the user is likely attempting to type. For example, if the user intends to type the word "query," the media guidance application may avoid generating for display any content that relates to the word "query" in display 102, and may instead generate for display promotional material in display 102 relating to the taco restaurant, such as a picture of a quesadilla, or a logo of the taco restaurant, on a display that shares the entry of the query. Moreover, the media guidance application may entirely remove key 112 from user interface 104.

In some embodiments, the media guidance application may receive a selection of a next character. For example, following from the "quesadilla" example, if the stem is "que," and user interface 104 is accentuating the characters "s" and "e" because "quesadilla" and "queen" both correspond to entries of the promotional database, the media guidance application may cause user interface 104 to be updated to accentuate the character "a" if the media guidance application receives a selection of the character "s." This is because the promotional database may detect that "quesadilla" corresponds to an entry of the promotional database, and that the character "a" is the next character in the string "quesadilla." In some embodiments, the media guidance application may then detect a deletion of a character in the stem "ques," such as a deletion of the character "s." In response to detecting the deletion of the character "s", the media guidance application may revert back to its previous state, where "s" and "e" are again highlighted, as the stem has reverted to "que." Thus, the media guidance application may dynamically update user interface 104 in any case where the stem or string entered by the user changes, no matter whether a character is added or deleted.

In some embodiments, the media guidance application may update a user profile as a user interacts with promotional content. For example, if promotional content relating to the rock band "Queen" is accessed by the user, the media guidance application may log this access. Similarly, if promotional content relating to the movie "Queen of the Night" is accessed by the user, the media guidance application may log this access. The media guidance application may determine, based on the logged access, whether a user has sufficiently accessed any given promotional content. In response to determining that the user has sufficiently accessed a given promotional content, the media guidance application may refrain from accentuating a character that corresponds to that given promotional content, thus allowing for other promotional content to be accentuated to the user. The media guidance application may determine that a user has sufficiently accessed any given promotional content based on any parameter, such as any or a combination of frequency of access, how long it has been since the last access occurred, how many times the promotional content has been accessed, and the like.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
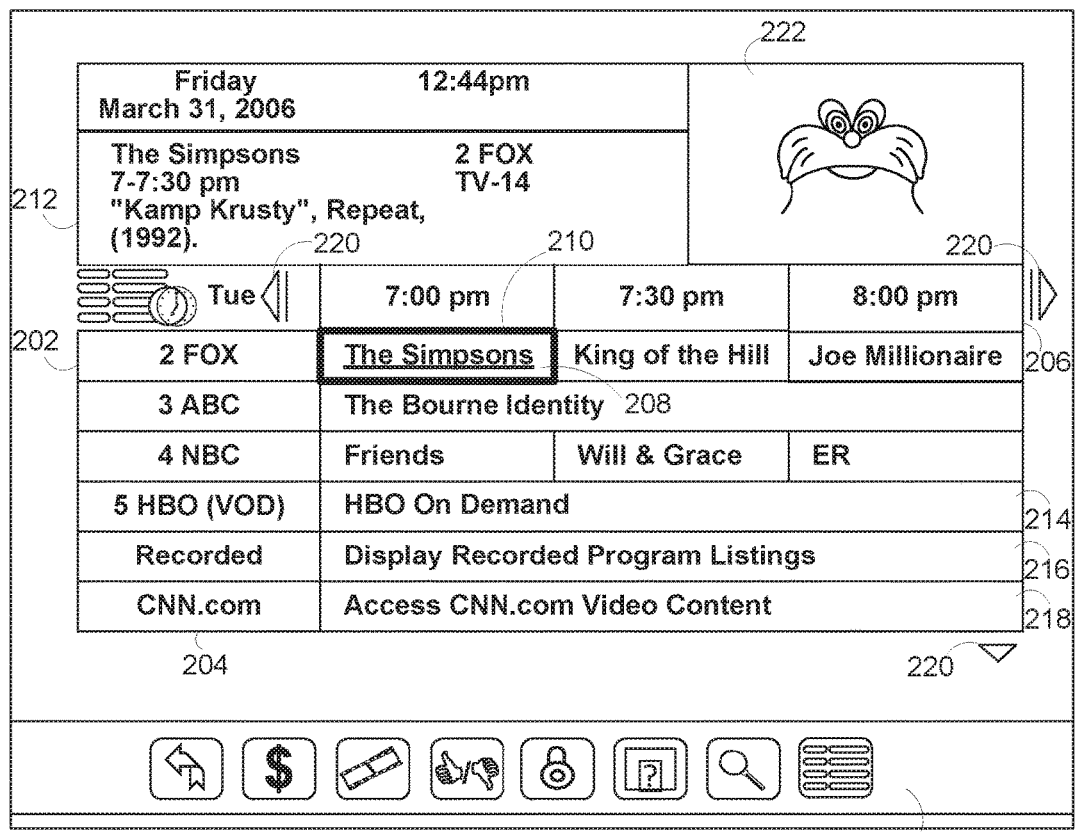
FIG. 2 shows an illustrative embodiment of a display screen that may be used to provide media guidance application listings and other media guidance information, in accordance with some embodiments of the disclosure.
Figure 3:
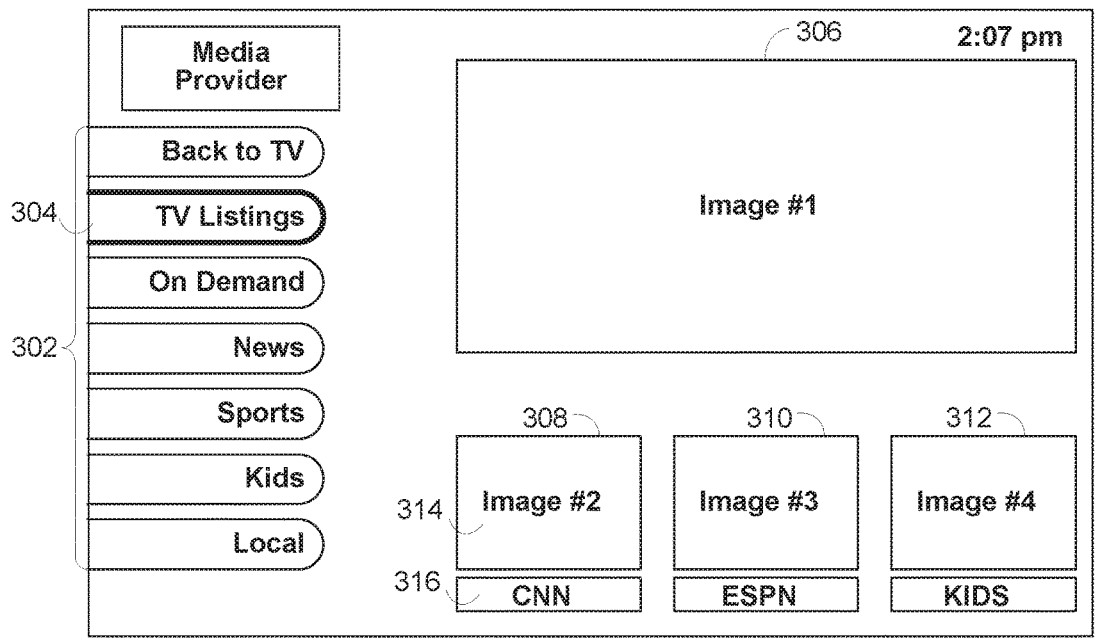
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
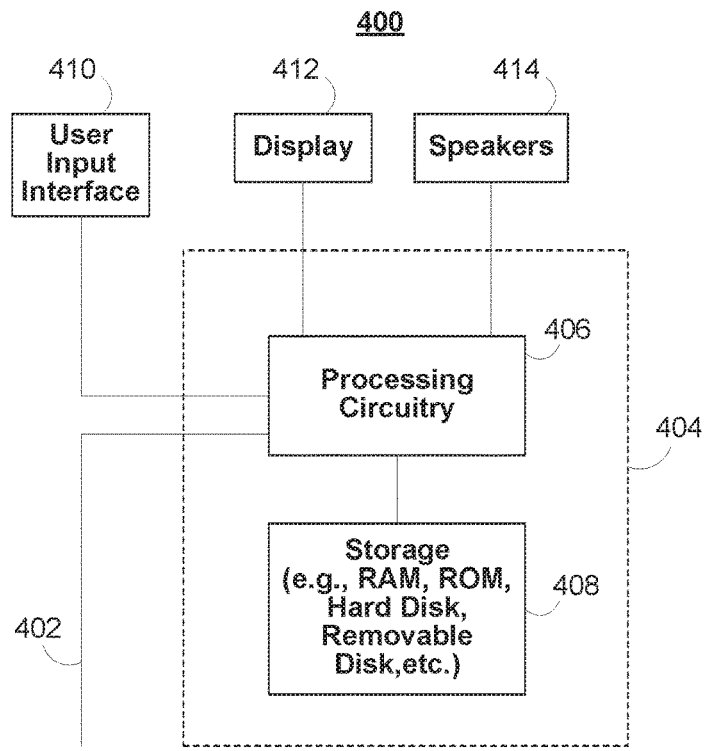
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
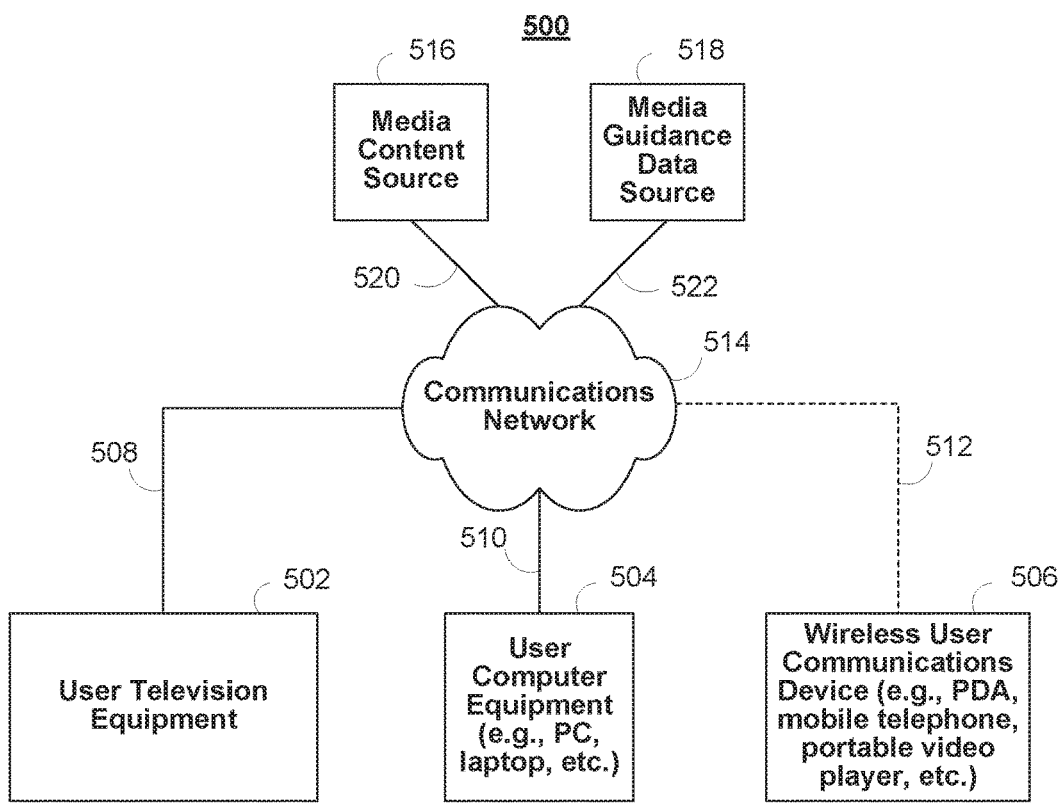
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some user television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
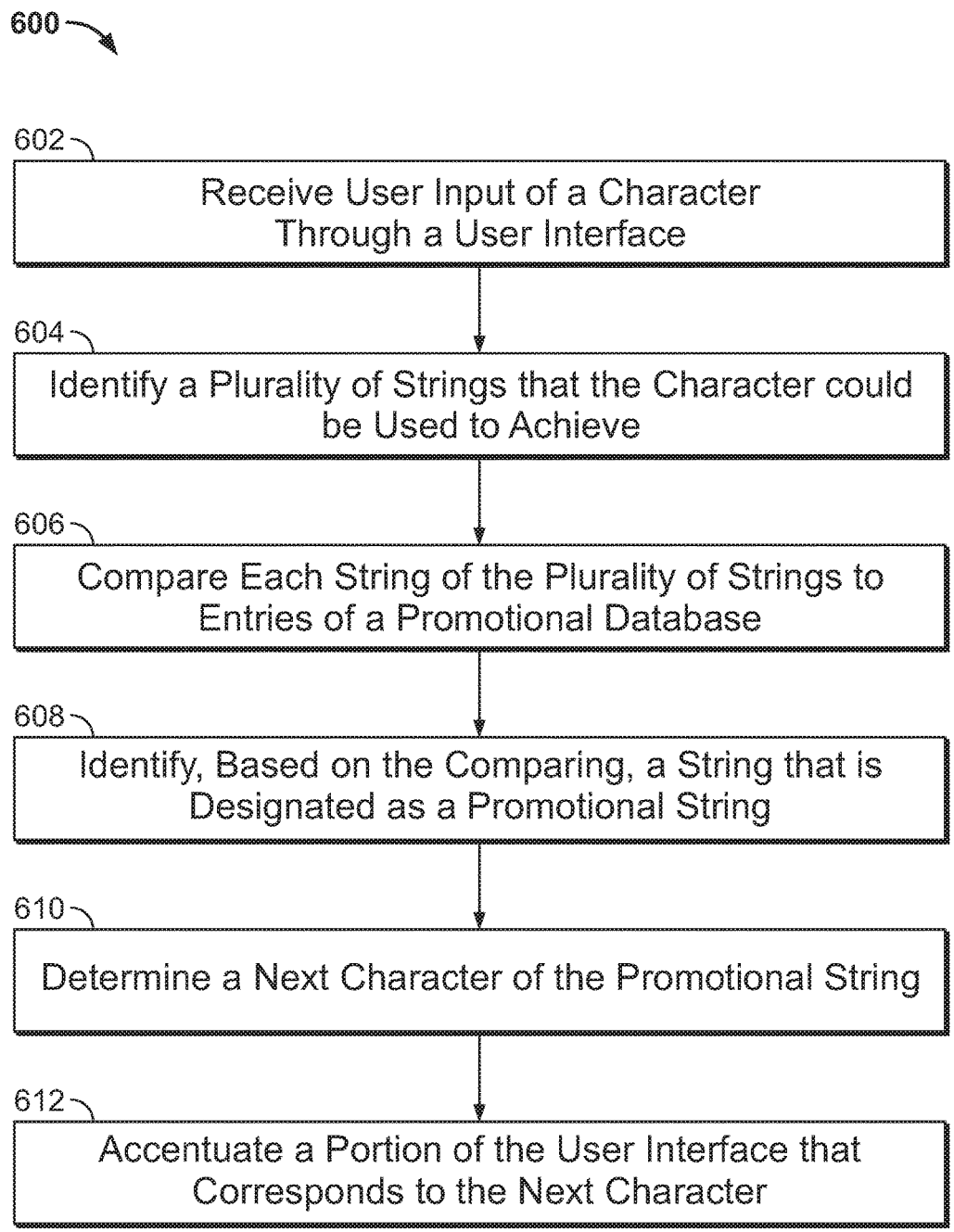
FIG. 6 depicts an illustrative flowchart of a process for determining that a character entered by a user relates to an incomplete string that corresponds to a string relating to promotional content, and for accentuating a next character of the promotional string, in accordance with some embodiments of the disclosure.

FIG. 6 depicts an illustrative flowchart of a process for determining that a character entered by a user relates to an incomplete string that corresponds to a string relating to promotional content, and for accentuating a next character of the promotional string, in accordance with some embodiments of the disclosure. Process 600 begins at 602, where a media guidance application executed by control circuitry 404 of user equipment 100 receives user input of a character through user interface 104. User equipment 100 may include the functionality of user television equipment 502, user computer equipment 504, and/or wireless user communications device 506. User interface 104 may be any user input interface 410, and may receive any user input that user input interface 410 is capable of receiving. As an example, if the stem "qu" has already been received by the media guidance application, at 602, the media guidance application may receive user input of the character "e," thus forming the stem "que."

Process 600 continues to 604, where the media guidance application may identify a plurality of strings that the character could be used to achieve. As discussed above, the media guidance application may identify the plurality of strings by consulting a database, such as media guidance data source 518, which is accessible by way of communications network 514. The database operations described above are equally applicable to 604.

Process 600 continues to 606, where the media guidance application may compare each string of the plurality of strings to entries of a promotional database. The promotional database may contain any of the functionality of media content source 516 or media guidance data source 518. The comparison operations described above are equally applicable to 606.

Process 600 continues to 608, where the media guidance application may identify, based on the comparing, a string that is designated as a promotional string. For example, the media guidance application may, based on the comparing, find a string that shares a same stem as what the media guidance application has determined that the user has entered. This is described in further detail in the foregoing.

Process 600 may continue to 610, where the media guidance application may determine a next character of the promotional string. As described above, the media guidance application may perform this determination by looking to the next character of the promotional string beyond the stem. Process 600 concludes at 612, where the media guidance application may accentuate a portion of the user interface that corresponds to the next character. Means of accentuation are described in the foregoing, and are further described with respect to FIG. 7 below.

Figure 7:
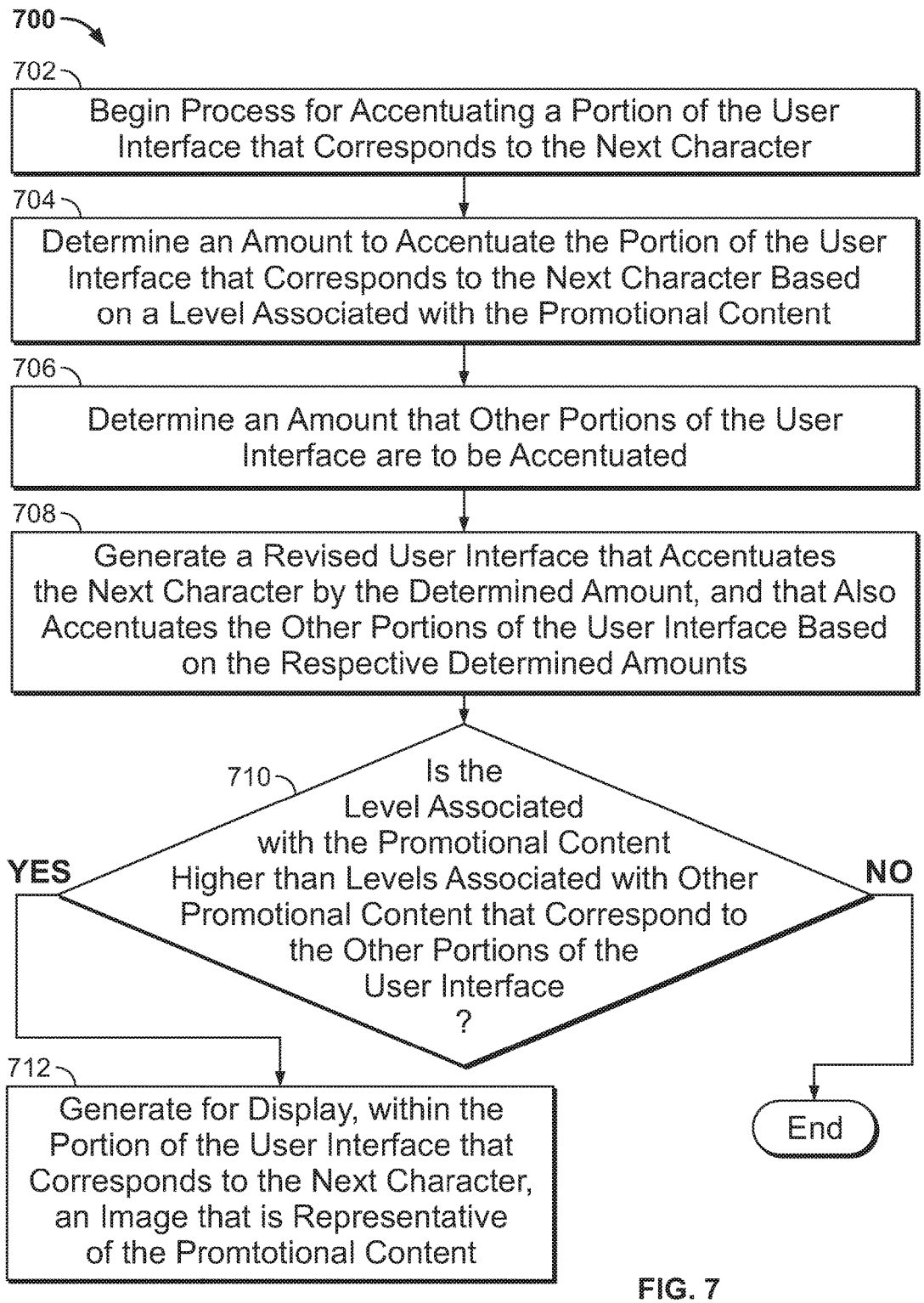
FIG. 7 depicts an illustrative flowchart of a process for accentuating a next character of a virtual keyboard that corresponds to promotional content, in accordance with some embodiments of the disclosure.

FIG. 7 depicts an illustrative flowchart of a process for accentuating a next character of a virtual keyboard that corresponds to promotional content, in accordance with some embodiments of the disclosure. Process 700 begins at 702, where the media guidance application of user equipment 100 begins a process for accentuating a portion of the user interface that corresponds to the next character (e.g., for accomplishing 612 of process 600).

Process 700 continues to 704, where the media guidance application may determine an amount to accentuate the portion of the user interface that corresponds to the next character based on a level associated with the promotional content. As described above, the media guidance application may access a promotional database (e.g., media guidance data source 518, accessible by way of communications network 514), and the promotional database may include data structures for each subscriber of the promotional service that indicates a level subscribed to by each subscriber. The media guidance application may base the determination of 704 on the content of these data structures.

At 706, the media guidance application may determine an amount that other portions of the user interface are to be accentuated. For example, if other portions of the user interface correspond to next characters that could lead to promotional content of other subscribers of the promotion service, the media guidance application may determine that other keys of user interface 104 should be accentuated using the same processes described with respect to 704.

At 708, the media guidance application may generate a revised user interface that accentuates the next character by the determined amount, and that also accentuates the other portions of the user interface based on the respective determined amounts. The media guidance application may perform the accentuation through any means described above, such as making keys of user interface 104 larger, using different coloration, and the like.

At 710, the media guidance application may determine whether the level associated with the promotional content is higher than levels associated with other promotional content that correspond to the other portions of the user interface. For example, the media guidance may reward a highest paying subscriber with some extra element of accentuation. If the media guidance application makes a determination in the affirmative, process 700 may proceed to 712, and if not, process 700 may end, and user interface 104 may be generated for display to the user (e.g., by way of display 412).

At 712, the media guidance application may generate for display (e.g., by way of display 412), within the portion of the user interface that corresponds to the next character, an image that is representative of the promotional content. This image may correspond to representation 108.

It should be noted that processes 600-700 or any step thereof could be performed on, or provided by, any of the devices shown in FIGS. 1 and 4-5. For example, any of processes 600-700 may be executed by control circuitry 404 (FIG. 4) as instructed by control circuitry implemented on user equipment 502, 504, and/or 506 (FIG. 5) in order to accentuate a character. In addition, one or more steps of processes 600-700 may be incorporated into or combined with one or more steps of any other process or embodiment.

It is contemplated that the steps or descriptions of each of FIGS. 6-7 may be used with any other embodiment of this disclosure. In addition, the steps and descriptions described in relation to FIGS. 6-7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-7.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, identifying a string that is promotional may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a promotional database, as described herein, may be stored in, and retrieved from, storage 408 of FIG. 4, or media guidance data source 518 of FIG. 5. Furthermore, processing circuitry, or a computer program, may update settings associated with a user, such as a likely next character of a string based on a user profile, stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for accentuating candidate characters of strings relating to promotional content, the method comprising:

receiving, through a user interface, user input of a stem comprising at least one character;

generating a plurality of expanded strings, wherein each of the plurality of expanded strings is generated by adding a respective set of subsequent characters after the stem;

determining whether a given expanded string of the plurality of expanded strings matches a keyword in a promotional database, wherein the promotional database associates the keyword with promotional content;

in response to determining that the given expanded string matches the keyword in the promotional database, determining a next character of the given expanded string; and accentuating a portion of the user interface that corresponds to the next character by:

comparing each expanded string of the plurality of expanded strings to a database that stores entries corresponding to monitored user interactions;

identifying, based on the comparing, an expanded string that the user is likely attempting to type;

determining a next character of the expanded string that the user is likely attempting to type; and causing a size of the next character of the given expanded string to exceed the size of the next character of the expanded string that the user is likely attempting to type.

2. The method of claim 1, wherein accentuating the portion of the user interface that corresponds to the next character comprises increasing a size of a virtual button relative to the size of virtual buttons corresponding to other candidate characters.

3. The method of claim 2, wherein accentuating the portion of the user interface that corresponds to the next character further comprises:

generating for display, within the virtual button, a representation of the promotional content;

receiving a user selection of the representation; and in response to receiving the user selection, generating for display the promotional content.

4. The method of claim 1, wherein determining whether the given expanded string of the plurality of expanded strings matches the keyword in the promotional database comprises identifying a plurality of keywords in the promotional database, wherein determining the next character of the given expanded string comprises determining a plurality of next characters, wherein each next character of the plurality of next characters corresponds to a respective keyword of the plurality of keywords, and wherein the method further comprises:

determining a level associated with each keyword of the plurality of keywords; and differently accentuating each next character in accordance with the level associated with the respective keyword that is associated with the next character.

5. The method of claim 4, wherein two different keywords correspond to a same next character, and wherein the method further comprises:

creating an aggregated accentuation by aggregating a first accentuation and a second accentuation corresponding to each of the two different keywords; and accentuating the same next character using the aggregated accentuation.

6. The method of claim 5, further comprising:

generating for display within the accentuated same next character a representation of each promotional content corresponding to the two different keywords;

receiving a user selection of one of the representations; and in response to receiving the user selection, generating for display the promotional content corresponding to the selected representation.

7. The method of claim 1, wherein accentuating the portion of the user interface that corresponds to the next character comprises reorganizing the user interface to include the next character in a preferred portion of the user interface.

8. The method of claim 1, wherein generating the plurality of expanded strings comprises:

accessing a database comprising entries corresponding to known words;

comparing the stem and any other characters that precede the stem to data of the entries; and identifying a plurality of words with stems that match the stem and any other characters that precede the stem.

9. The method of claim 1, further comprising:

generating for display a visual representation of the promotional content; and squelching a display of content relating to the expanded string that the user is likely attempting to type.

10. A system for accentuating candidate characters of strings relating to promotional content, the system comprising:

communications circuitry;

user interface circuitry; and control circuitry configured to:

receive, using the user interface circuitry, user input of a stem comprising at least one character through a user interface;

generate a plurality of expanded strings, wherein each of the plurality of expanded strings is generated by adding a respective set of subsequent characters after the stem;

determine whether a given expanded string of the plurality of expanded strings matches a keyword in a promotional database, wherein the promotional database associates the keyword with promotional content;

in response to determining that the given expanded string matches the keyword in the promotional database, determine a next character of the given expanded string; and accentuate a portion of the user interface that corresponds to the next character by:

comparing each expanded string of the plurality of expanded strings to a database that stores entries corresponding to monitored user interactions;

identifying, based on the comparing, an expanded string that the user is likely attempting to type;

determining a next character of the expanded string that the user is likely attempting to type; and causing a size of the next character of the given expanded string to exceed the size of the next character of the expanded string that the user is likely attempting to type.

11. The system of claim 10, wherein the control circuitry is further configured, when accentuating the portion of the user interface that corresponds to the next character, to increase a size of a virtual button relative to the size of virtual buttons corresponding to other candidate characters.

12. The system of claim 11, wherein the control circuitry is further configured, when accentuating the portion of the user interface that corresponds to the next character, to:

generate for display, within the virtual button, a representation of the promotional content;

receive a user selection of the representation; and in response to receiving the user selection, generate for display the promotional content.

13. The system of claim 10, wherein the control circuitry is further configured to determine whether the given expanded string of the plurality of expanded strings matches the keyword in the promotional database by identifying a plurality of keywords in the promotional database, wherein the control circuitry is further configured to determine the next character of the given expanded string by determining a plurality of next characters, wherein each next character of the plurality of next characters corresponds to a respective keyword of the plurality of keywords, and wherein the control circuitry is further configured to:

determine a level associated with each keyword of the plurality of keywords; and differently accentuate each next character in accordance with the level associated with the respective keyword that is associated with the next character.

14. The system of claim 13, wherein two different keywords correspond to a same next character, and wherein the control circuitry is further configured to:
- create an aggregated accentuation by aggregating a first accentuation and a second accentuation corresponding to each of the two different keywords; and
- accentuate the same next character using the aggregated accentuation.

15. The system of claim 14, wherein the control circuitry is further configured to:
- generate for display within the accentuated same next character a representation of each promotional content corresponding to the two different keywords;
- receive a user selection of one of the representations; and
- in response to receiving the user selection, generate for display the promotional content corresponding to the selected representation.

16. The system of claim 10, wherein the control circuitry is further configured, when accentuating the portion of the user interface that corresponds to the next character, to reorganize the user interface to include the next character in a preferred portion of the user interface.

17. The system of claim 10, wherein the control circuitry is further configured, when generating the plurality of expanded strings, to:
- access a database comprising entries corresponding to known words;
- compare the stem and any other characters that precede the stem to data of the entries; and
- identify a plurality of words with stems that match the stem and any other characters that precede the stem.

18. The system of claim 10, wherein the control circuitry is further configured to:
- generate for display a visual representation of the promotional content; and
- squelch a display of content relating to the expanded string that the user is likely attempting to type.

* * * * *